United States Patent [19]
Ushirokawa et al.

[11] Patent Number: 5,646,964
[45] Date of Patent: Jul. 8, 1997

[54] DS/CDMA RECEIVER FOR HIGH-SPEED FADING ENVIRONMENT

[75] Inventors: Akihisa Ushirokawa; Shosei Yoshida, both of Tokyo, Japan

[73] Assignee: NEC Corporation, Japan

[21] Appl. No.: 272,689

[22] Filed: Jul. 8, 1994

[30] Foreign Application Priority Data

Jul. 8, 1993 [JP] Japan ................... 5-169092

[51] Int. Cl.$^6$ .................................................. H03D 1/04
[52] U.S. Cl. .................... 375/346; 375/232; 375/349; 375/350; 370/342; 455/65; 455/506
[58] Field of Search .................. 375/200–208, 375/232, 233, 234, 260, 285, 326, 340, 344, 346, 348, 349, 350, 371; 455/50, 52.1, 52.3, 63, 65, 67.6, 296, 303, 304, 307; 370/18, 69.1, 93, 123

[56] References Cited

U.S. PATENT DOCUMENTS

| | | | |
|---|---|---|---|
| 3,993,956 | 11/1976 | Gilmore et al. | 375/330 |
| 4,328,587 | 5/1982 | Mizuno et al. | 375/326 |
| 4,985,900 | 1/1991 | Rhind et al. | 375/224 |
| 5,341,395 | 8/1994 | Bi | 375/205 |
| 5,361,276 | 11/1994 | Subramanian | 375/200 |
| 5,377,225 | 12/1994 | Davis | 375/205 |
| 5,550,810 | 8/1996 | Monogiioudis et al. | 375/348 |

OTHER PUBLICATIONS

M. Abdulrahman, et al., Equalization for Interference Cancellation in Spread Spectrum Multiple Access Systems, *IEEE 42nd VTS Conference Record*, vol. 1, May 1992, NY, USA.

Ruxandra Lupas, et al., Near–Far Resistance of Multiuser Detectors in Asynchronous Channels, *IEEE Transactions on Communications*, vol. 38, No. 4, pp. 496–508, Apr. 1990.

M. Abdulrahman et al., Equalization For Interference Cancellation in Spread Spectrum Multiple Access Systems, Proceedings of VTC '92, pp. 71–74, May 1992.

A. Higashi, BER Performance of Adaptive RAKE Diversity (ARD) in DPSK DS/CDMA Mobile Radio, *IEEE Second International Symposium on Spread Spectrum Techniques and Applications (ISSTA '92)*, 75–78, Yokohama, Japan, Nov. 29–Dec. 2, 1992.

*Primary Examiner*—Stephen Chin
*Assistant Examiner*—Amanda T. Le
*Attorney, Agent, or Firm*—Ostrolenk, Faber, Gerb & Soffen, LLP

[57] ABSTRACT

A receiver is disclosed for a DS/CDMA communication system wherein a symbol is spread with a predetermined spread code to produce a DS/CDMA signal which is transmitted on a radio frequency carrier. The receiver includes an interference canceller for cancelling signals from undesired sources introduced to a signal received from a desired source using a feedback signal. A phase variation canceller is provided for cancelling a phase variation that occurs in an interval between successive symbols of the received signal. Both cancellers are connected in series. A decision circuit compares an input signal from the interference canceller or from the phase variation canceller with a threshold and produces an output representing one of two discrete values depending on whether it is higher or lower than the threshold. A correction circuit derives a correction signal from a signal produced by the interference canceller and applies it to the interference canceller as the feedback signal.

42 Claims, 10 Drawing Sheets

INTERFERENCE CANCELLER 4

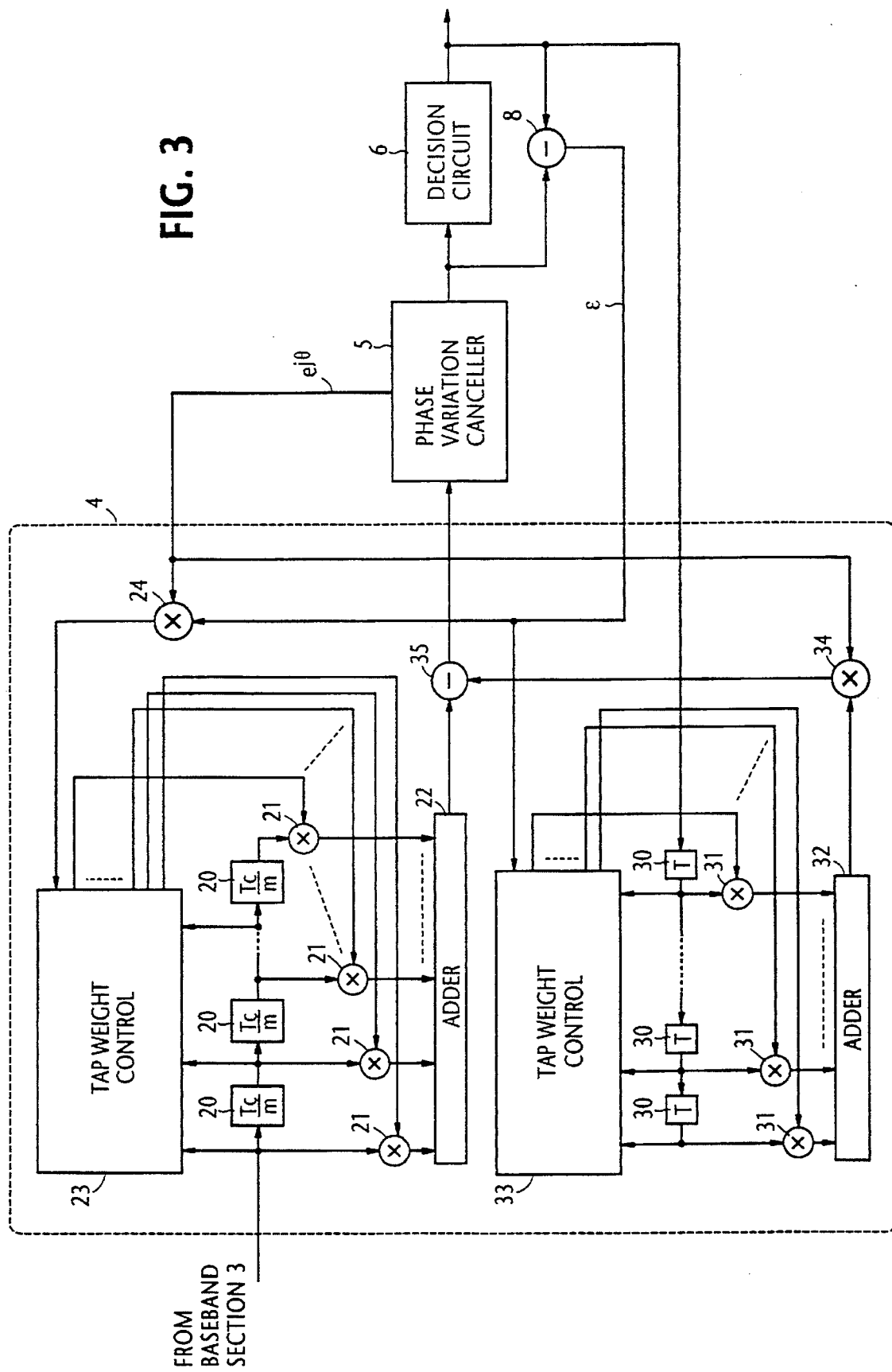

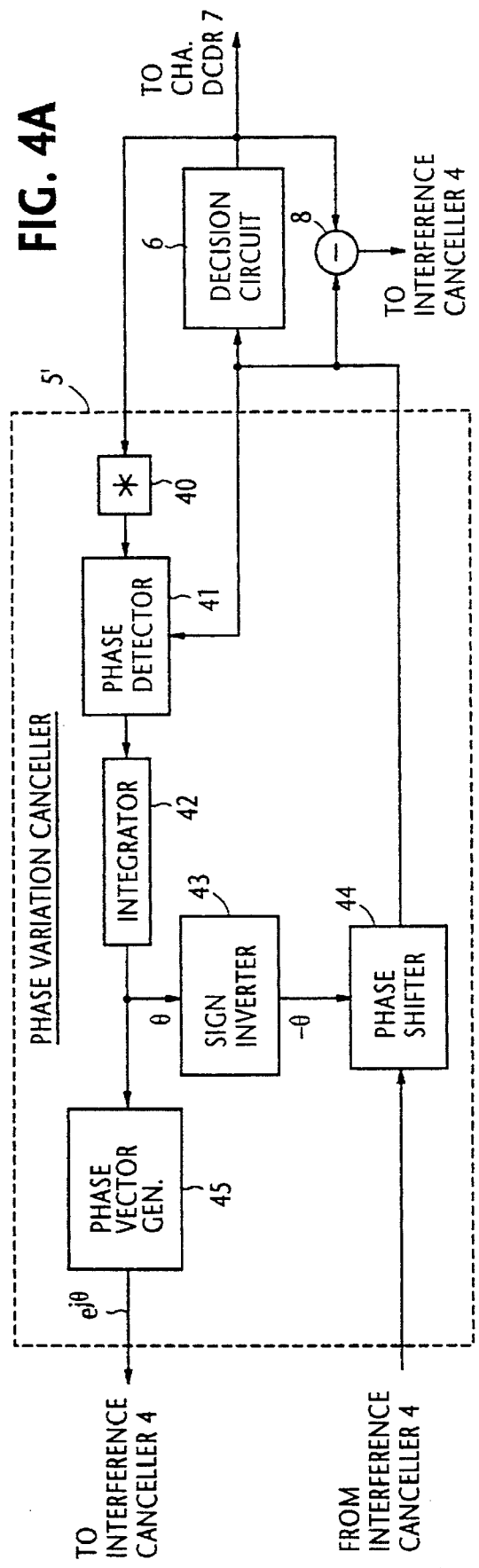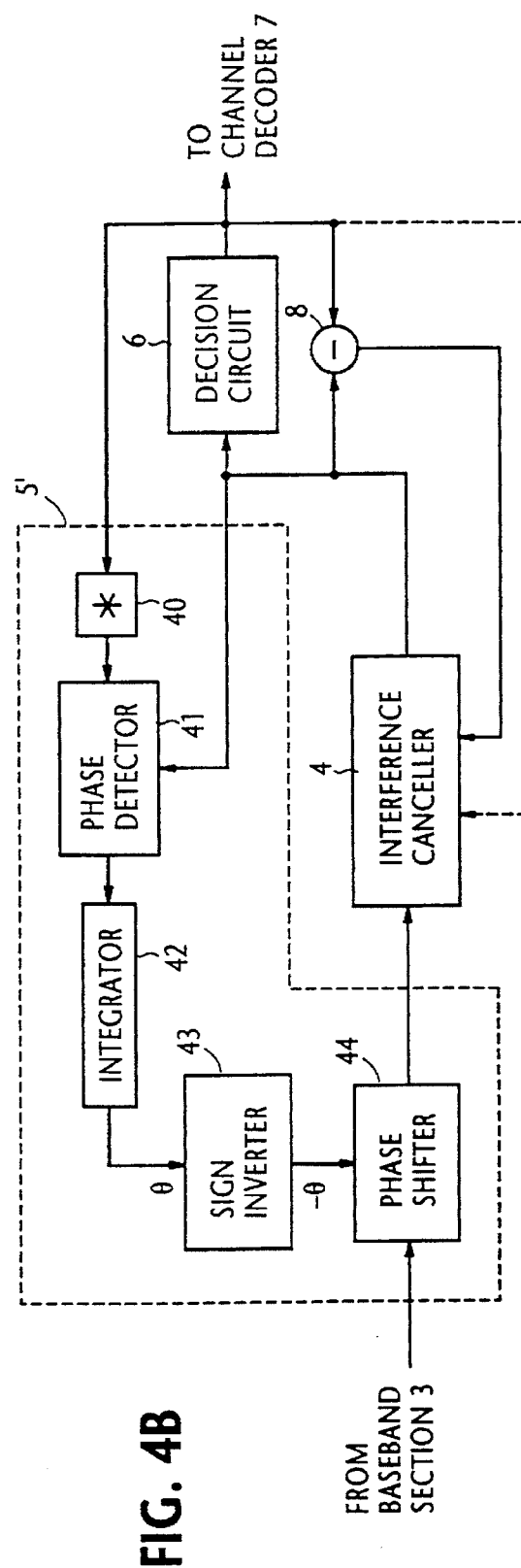

DS/CDMA RECEIVER FOR HIGH-SPEED FADING ENVIRONMENT

BACKGROUND OF THE INVENTION

1. Field of the Invention

The present invention relates generally to direct sequence/code division multiple access (DS/CDMA) cellular mobile communication systems, and more specifically to a DS/CDMA receiver which is particularly suitable for use in cell-site stations.

2. Description of the Related Art

Commercial interest in DS/CDMA communication systems has recently risen dramatically due to their potential ability to provide service to more users than is offered by other access techniques. In the DS/CDMA system, each mobile station includes a channel encoder and a multiplier for multiplying the output of the encoder with a distinct spread code. The output of the multiplier is modulated on a carrier for transmission. Signals from mobile stations are code division multiplexed with other signals within the same frequency spectrum, and the signal at the input of each DS/CDMA cell-site receiver is therefore a sum of the signals from the mobile stations. At a cell-site station, a plurality of CDMA receivers are provided, one for each mobile station. Each cell-site receiver multiplies a received bit sequence with a distinct spread code, which may be preassigned or assigned on an as-needed basis, so that signals from undesired mobile stations are "spread" over the frequency spectrum of the system and become noise, while the components of the desired signal are "despread" into a signal having a significant amplitude. The noise resulting from the spreading of undesired signals may be insignificant if the number of mobile stations is small. However, the noise level will have an interfering effect on the desired signal if the number of mobile stations increases.

For interference cancellation, a multiuser DS/CDMA receiver that utilizes the spread codes of all mobile users is described in a paper titled "Near-Far Resistance of Multiuser Detectors in Asynchronous Channels", Ruxandra Lupas et al, IEEE Transactions on Communications, Vol., 38, No. 4, Apr. 1990, pages 496–508. However, it is complex and impractical in certain cases because each mobile user must have the knowledge of all other spread codes. A single user receiver using the spread code of its own receiver for interference cancellation is described in a paper "Equalization for Interference Cancellation in Spread Spectrum Multiple Access Systems", M. Abdulrahman et al, Proceedings of VTC '92, May 1992, pages 71–74. This single user receiver cancels interference by using an equalizer. The output of the equalizer is applied to a decision circuit whose output is coupled to a channel decoder. A matched filter (despreading filter) may be provided between the band-limiting filter and the equalizer and a spread code is applied to the matched filter as tap weight coefficients to extract the desired signal, while the interference that remains at the output of the matched filter is eliminated by the equalizer.

However, since the equalizer's tap weight control is performed at the same time with carrier synchronization, there is an undesired mutual interaction between phase tracking and interference cancellation in a high-speed fading environment, causing a loss of phase synchronization.

On the other hand, the RAKE receiver is well known as an optimum receiver for multipath environment. Since the RAKE receiver attempts to collect the signal energy from all the received signal paths that fall within the span of its delay line and carry the same information, its action is somewhat analogous to an ordinary garden rake, and hence, the name "RAKE receiver" has been coined. However, the prior art RAKE receiver was not designed with interference from other signal sources in mind. An adaptive RAKE receiver is described in a paper titled "BER Performance of Adaptive RAKE Diversity (ARD) in DPSK DS/CDMA Mobile Radio", Akihiro Higashi et al., Proceedings of ISSTA '92, November–December, 1992, pages 75–78. The adaptive RAKE receiver provides diversity combining of all arriving signals by weighting them with tap weight coefficients which are determined with other signal sources in mind so that the desired signal can be extracted efficiently, instead of recognizing all the temporal components of a matched filter as a desired signal and combining them with equal gain. However, the signal detection at every instant is determined exclusively by the use of a matched filter, and the interfering signals are not cancelled during the time prior to the diversity combining.

In summary, any of the prior art DS/CDMA receivers is not satisfactory in carrier phase tracking and interference cancellation performance under high-speed fading and multipath environments.

SUMMARY OF THE INVENTION

It is therefore an object of the present invention to provide a DS/CDMA receiver capable of satisfactory, operation for high-speed fading and multipath environments.

According to a first aspect, the present invention provides a receiver for a DS/CDMA communication system wherein a symbol is spread with a predetermined spread code to produce a DS/CDMA signal which is transmitted on a radio frequency carrier. The receiver includes a receiver means for receiving the signal from a desired source. An interference canceller is provided for cancelling signals from undesired sources introduced to the received signal according to a feedback signal. A phase variation canceller is provided for cancelling a phase variation that occurs in an interval between successive symbols of the received signal. Both cancellers are connected in series. A decision circuit compares an input signal from the phase variation canceller or from the interference canceller with a decision threshold and produces an output signal representing one of two discrete values depending on whether the input signal is higher or lower than the threshold. A correction signal circuit derives a correction signal from a signal produced by the interference canceller and applies the correction signal to the interference canceller as the above-mentioned feedback signal.

In one embodiment, the phase variation canceller is connected to the output of the interference canceller and comprises a delay element for introducing a delay corresponding to one symbol of the DS/CDMA signal into the output signal of the interference canceller and a multiplier for multiplying the output signal of said interference canceller with the signal delayed by said delay element.

In a modified embodiment, the phase variation canceller is connected between the interference canceller and the decision circuit, and comprises means for deriving a reference carrier from input and output signals of the decision circuit and means for synchronizing the output signal of the interference canceller to the reference carrier. Alternatively, the phase variation canceller is connected between the receiver means and the interference canceller, and comprises means for deriving a reference carrier from input and output signals of the decision circuit and means for synchronizing the output signal of the receiver means to the reference carrier.

According to a second aspect, the present invention provides a DS/CDMA receiver for multipath environment. The receiver comprises a receiver means for receiving the signal from a desired source, and a delay line connected to the receiver means, the delay line having a plurality of successive taps. A plurality of interference cancellers are connected respectively to the successive taps of the delay line, each of the interference cancellers cancelling components of the signal from the desired source according to a first feedback signal, the components being introduced to the signal received by the receiver means as a result of multipath fading effect. A maximum ratio combiner is provided for weighting output signals of the interference cancellers according to a second feedback signal and summing the weighted output signals to produce a weighted sum signal. A decision circuit compares the weighted sum signal with a decision threshold to produce an output signal representing one of two discrete values depending on whether the weighted sum signal is higher or lower than the threshold, and supplies the output signal of the decision circuit to the maximum ratio combiner as the second feedback signal. An error detector detects an error between the input and output signals of the decision circuit and applies the detected error to each of the interference cancellers as the first feedback signal.

According to a third aspect, the present invention provides a DS/CDMA receiver for high-speed fading and multipath fading environment. The receiver comprises a receiver means for receiving the signal from a desired source, and a delay line connected to the receiver means, the delay line having a plurality of successive taps. A plurality of interference cancellers are connected respectively to the successive taps of the delay line, each of the interference cancellers cancelling components of the signal from the desired source according to a correction signal, the components being introduced to the signal received by the receiver means as a result of multipath fading effect. A plurality of phase variation cancellers are connected respectively to the outputs of the interference cancellers, each of the phase variation cancellers cancelling a phase variation that occurs in an interval between successive symbols of the signal received by the receiver means. Means are provided for combining output signals of the phase variation cancellers to produce a sum signal. A decision circuit compares the sum signal with a decision threshold to produce an output signal representing one of two discrete values depending on whether the sum signal is higher or lower than the threshold. An error detector detects an error between the input and output signals of the decision circuit and applies the detected error to each of the interference cancellers as the correction signal.

BRIEF DESCRIPTION OF THE DRAWINGS

The present invention will be described in further detail with reference to the accompanying drawings, in which:

FIG. 3 is a block diagram of an interference canceller implemented in a decision feedback equalizer configuration;

FIG. 4A is a block diagram of a DS/CDMA receiver using a phase variation canceller of modified embodiment;

FIG. 4B is a block diagram of an modification of the DS/CDMA receiver of FIG., 4A;

DETAILED DESCRIPTION

Figure 1:
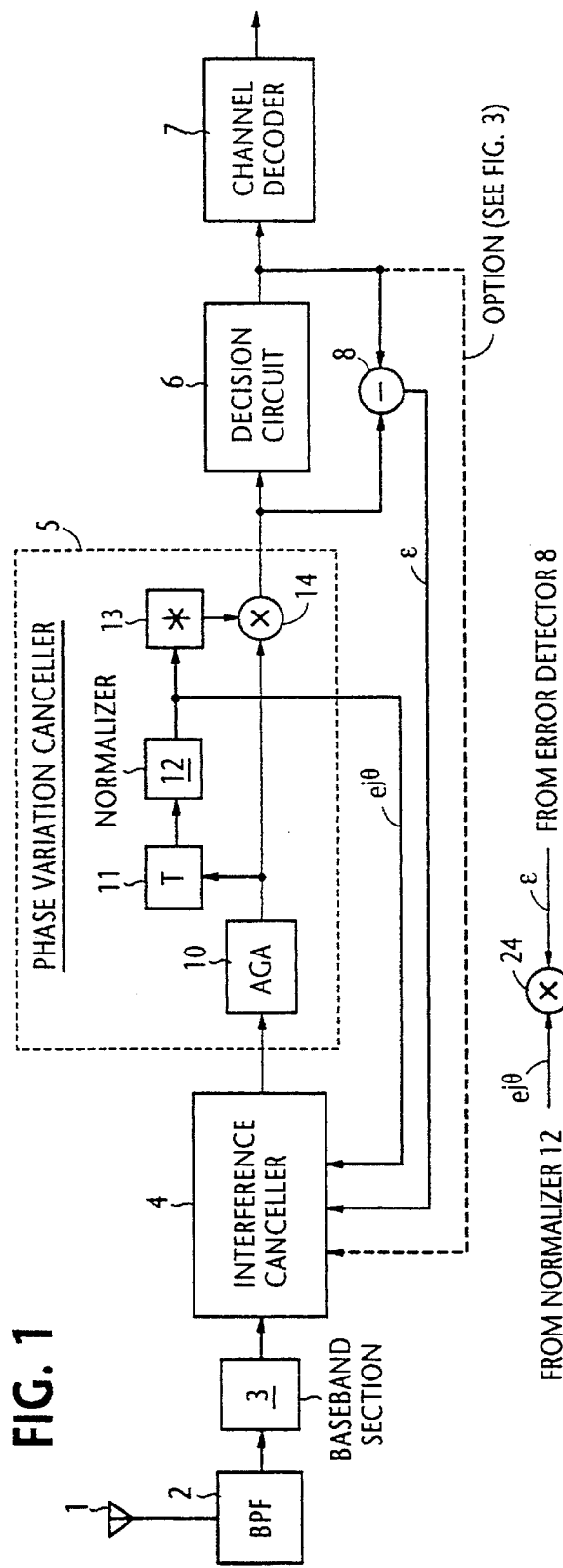
FIG. 1 is a block diagram of a DS/CDMA receiver according to a first embodiment of the present invention using a phase variation canceller of differential detector configuration.

Referring now to FIG. 1, there is shown a DS/CDMA receiver at a cell-site station according to a first embodiment of the present invention. At the cell-site station, the DS/CDMA receiver for each mobile user comprises a bandpass filter 2, a baseband section 3, an interference canceller 4, a phase variation canceller 5, a decision circuit 6 and a channel decoder 7. Decision circuit 6 compares the output of phase variation detector 6 with a predetermined threshold and makes a decision in favor of a logic 1 or 0 depending on whether it is higher or lower than the threshold. The output of the decision circuit 6 is presented to the channel decoder 7 where it is decoded in a process inverse to that of the channel encoder at the mobile station transmitter. An error detector 8 is connected between the input and output of decision circuit 6 to detect a decision error $\epsilon$.

At the mobile station, each transmit symbol is modulo-2 summed, or chipped with the bits of a distinct spread code (such as pseudo-random bit sequence) of M-chip length to produce a direct sequence spread spectrum signal, which is modulated upon a carrier and transmitted. The transmitted carrier is detected by the cell-site DS/CDMA receiver at antenna 1 and fed to the bandpass filter 2 where it is band-limited to the frequency spectrum of the DS/CDMA system. The band-limited signal is applied to the baseband section 3 where the signal frequency is converted to baseband.

The baseband signal is applied to the interference canceller 4 of transversal filter structure having tap weight coefficients which are adaptively controlled so that their vectors are orthogonal to all the spread codes except for one used at the mobile station of interest.

The output of interference canceller 4 is applied to the phase variation canceller 5 where undesired phase variations caused by high-speed fading that occurs in the transmission channel are cancelled. Specifically, the phase variation canceller 5 preferably comprises an automatic gain controlled amplifier 10 that develops an output having a constant level. The output of AGA 10 is applied to a delay element 11 which introduces a delay corresponding to symbol time T. The output of the delay element 11 is applied to a normalizer 12 where the amplitude of the signal is normalized. A complex-valued version of the normalized signal is produced by a complex conjugate converter 13 and supplied to a multiplier 14 where it is multiplied with the output of AGA 10.

At time k+1, the output of delay element 11 has a phase angle $\theta_k$ and the output of AGA 10 has a phase angle $\theta_{k+1}$, which are given by:

$$\theta_k = \phi_k + \varphi_k \quad (1)$$

$$\theta_{k+1} = \phi_{k+1} + \varphi_{k+1} \quad (2)$$

where $\phi_k$ is the phase angle of the transmit signal at time k, and $\varphi_k$ is a carrier phase component at time k attributed by the transmission channel. Since the output of AGA 10 is given by a phase angle $\theta_{k+1}$, the multiplier 14 develops a signal which represents the phase difference $\theta_{k+1} - \theta_k$. If the phase component $\varphi_k$ of the channel is approximately equal to the phase component $\varphi_{k+1}$ at time k+1, the phase difference $\theta_{k+1} - \theta_k$ does not contain the carrier phase component and corresponds to a phase change in the transmitted information bearing signal. Thus, at the output of the multiplier 14 the carrier phase component is cancelled.

The use of automatic gain controlled amplifier 10 and normalizer 12 serves to improve the performance of the phase variation canceller 5.

Figure 2:
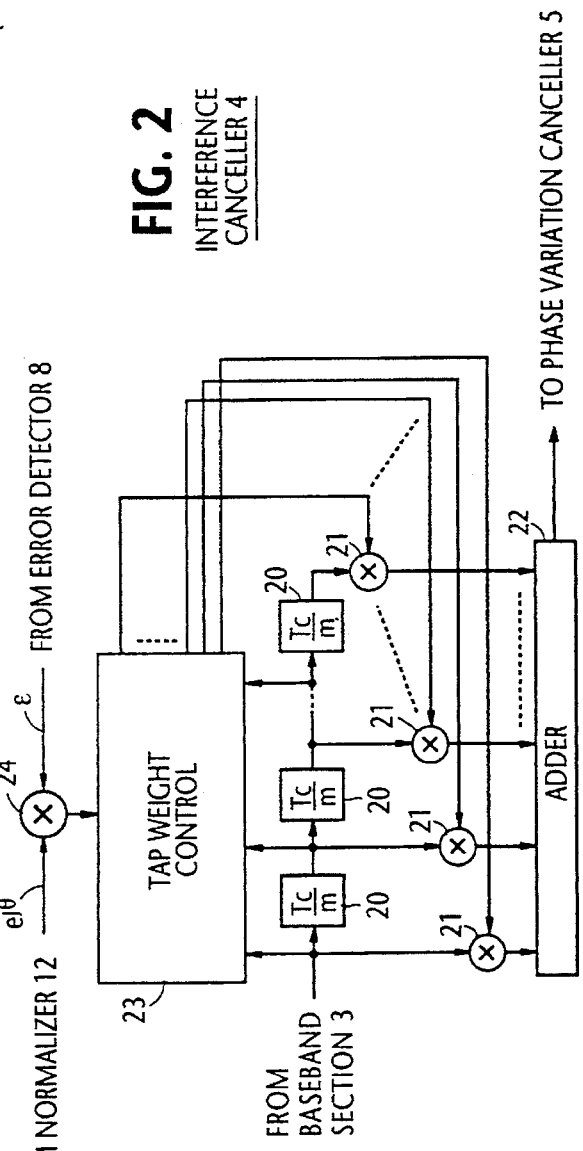
FIG. 2 is a block diagram of an interference canceller implemented in a linear equalizer configuration.

As illustrated in FIG. 2, the interference canceller 4 includes a transversal equalizer comprising a tapped delay line formed by a series of delay-line elements 20 each with a delay time Tc/m, where Tc is the chip interval between successive bits of the spread code used, and m is an integer. The baseband signal is the input to the delay line to produce successively delayed signals. To the delay-line elements are connected a plurality of tap weight multipliers 21 for weighting the delay-line tap signals with respective tap-weight coefficients. The weighted signals are summed by an adder 22 to produce a sum signal which is applied to the phase variation canceller 5. To produce the tap weight coefficients, the successive signals on the delay line are supplied to a tap weight controller 23 where their correlations with the output of a multiplier 24 are taken according to a known adaptive control algorithm in such a manner that the mean square value of the decision error $\epsilon$ is reduced to a minimum. Least mean square, least square method and recursive least squares can be used to advantage. To this end, the decision error $\epsilon$ from error detector 8 is weighted by the multiplier 24 with an output signal $e^{j\theta}$ (phase rotation vector) from the normalizer 12 to produce a signal $e^{j\theta} \times \epsilon$, which is applied to the tap weight controller 23. Tap weight controller 23 includes a plurality of update circuits (not shown) corresponding to the tap weight multipliers 21. If the LMS algorithm is used, each update circuit "i" derives a tap weight coefficient $a_i$ for the corresponding tap weight multiplier by solving the following Equation:

$$a_i(k+1) = a_i(k) + \mu \epsilon(k) e^{j\theta} r_i^*(k) \quad (2)$$

where $a_i(k)$ is the tap weight coefficient at time k, $\mu$ is the stepsize, and $r_j^*(k)$ is the complex-conjugated signal at corresponding delay-line tap 20. In this way, the tap weight coefficients are controlled and their vectors are oriented in a direction orthogonal to those of the undesired components of the received signal and aligned with the output vector of the adder 22.

Preferably, the interference canceller additionally includes a feedback equalizer as illustrated in FIG. 3. This feedback equalizer is comprised by a delay line of taps 30 each successively introducing a delay corresponding to the symbol interval T to the output of decision circuit 6. The output of each delay-line tap 30 is supplied to a corresponding tap weight multiplier 31 where it is weighted by a tap weight coefficient $b_i(k)$. After summing the weighted tap signals by an adder 32, a signal representing the weighted sum is multiplied by the signal $e^{j\theta}$ from phase variation canceller 5. The difference between the outputs of the adders 22 and 32 of the equalizers is taken by a subtractor 35 and applied to the input of phase variation canceller 5.

The tap weight coefficient $b_i(k)$ of the feedback equalizer is derived by a tap weight controller 33 which includes a plurality of update circuits respectively corresponding to the multipliers 31. Each update circuit of the tap weight controller 33 updates the tap weight coefficient $b_i(k)$ of the corresponding multiplier according to the following Equation:

$$b_i(k+1) = b_i(k) + \mu \epsilon(k) d_i^*(k) \quad (4)$$

where $d_i^*(k)$ is the complex-conjugated signal at corresponding delay-line tap 30. The algorithm known as minimum mean square error (MMSE) is achieved by the simultaneous solution of Equations (3) and (4). As a result, the vectors of all the tap weight coefficients $a_i(k)$ of multipliers 21 are rendered orthogonal to the vectors of all undesired signals, eliminating their interference.

A modification of the phase variation canceller of the previous embodiment, as indicated by numeral 5', is shown in FIG. 4A. In this modification, the phase variation canceller 5' includes a complex conjugate converter 40 which develops a complex-valued version of the output of decision circuit 6. The output of complex conjugate converter 40 is applied to one input of a phase detector 41 whose output is coupled to an integrator 42. The canceller 5' further includes a sign inverter 43 for inverting the sign of the phase value $\theta$. The output of sign inverter 43 and the output of interference canceller 4 are applied to a phase shifter 44 whose output is connected to the input of decision circuit 6. A phase vector generator 45 is connected to the output of integrator 42 to develop a phase rotation vector $e^{j\theta}$ for application to the interference canceller 4.

In operation, the phase detector 41 detects a phase difference $\Delta\theta$ between the input and output of decision circuit 6. This phase difference is integrated by integrator 42 with previous values of phase difference in order to produce a signal representing an updated phase value $\theta$ of the transmitted carrier. The phase value, which is inverted by the sign inverter 43, is applied to the phase shifter 44 as a reference carrier which is synchronized to the transmitted carrier. Phase shifter 44 multiplies the signal from the interference canceller with the reference signal, so that the undesired carrier phase that occurs as a result of high-speed fading is cancelled.

The embodiment of FIG. 4A may be modified as shown in FIG. 4B in which the phase variation canceller is connected to the output of baseband section 3 and the interference canceller 4 is connected between the phase variation canceller 5' and the input of decision circuit 6. In the embodiments of FIG. 4B, the interference canceller 4 only receives the output of error detector 8 and applies it direct to the tap weight controller 23. Therefore, in FIG. 4B, the phase vector generator 45 is dispensed with.

Figure 5:
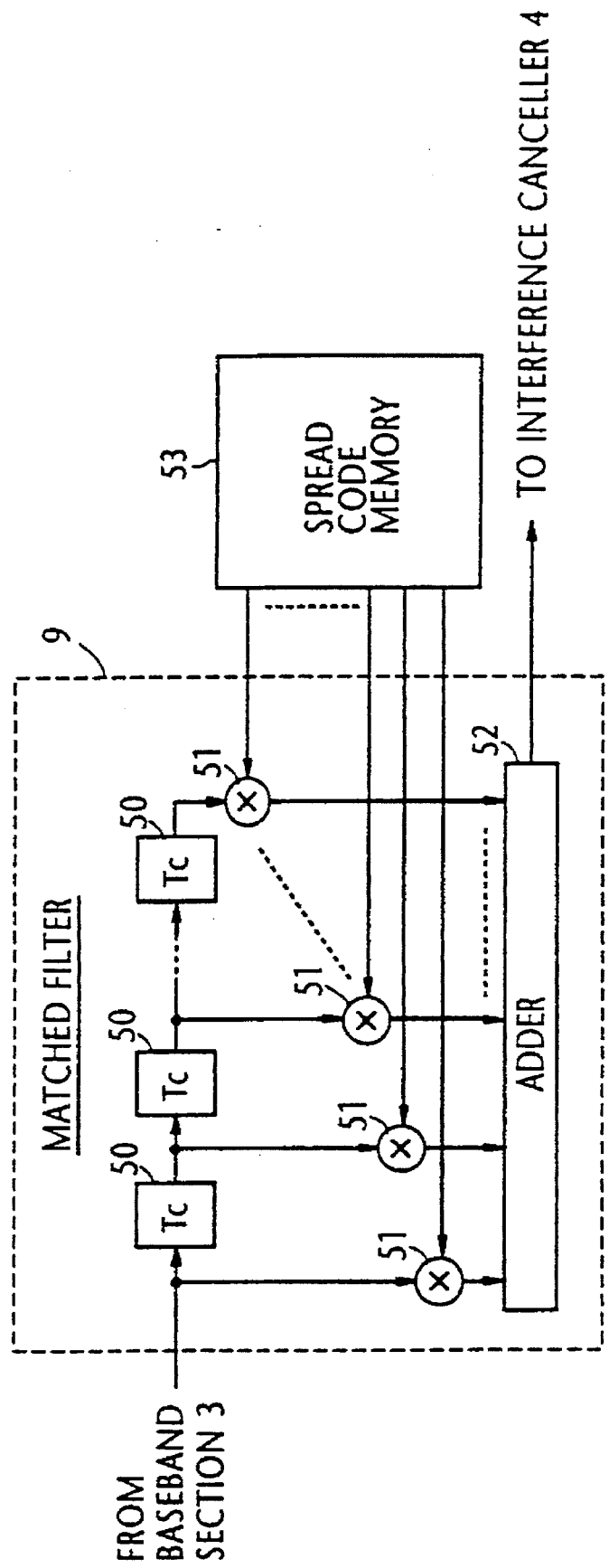
FIG. 5 is a block diagram of a matched filter used in the present invention.

In the previous embodiments, the tap weight coefficients of the interference canceller 4 are controlled in such a manner that their vectors are oriented in a direction orthogonal to the vectors of all the undesired signals. In some cases where the number of undesired signal sources is relatively small, the tap weight coefficients have a high degree of correlation with the spread code used at the transmitters. For such applications, a matched filter 9, as illustrated in FIG. 5, can be used to advantage by connecting it between the output of baseband section 3 and the input of interference canceller 4. Matched filter 9 includes delay-line elements 50 connected in series to the output of the baseband section 3. To the delay-line elements 50 are respectively connected tap weight multipliers 51 whose tap weight coefficients are controlled in response to the bits of a spread code supplied from a spread code memory 53 as corresponding to the spread code used at the transmitter. The tap signals are weighted respectively by corresponding multipliers 51 and summed by an adder 52 and a signal is developed indicating the sum of the weighted signals. As a result, the received chip-rate components of the desired signal are "despread" into a signal as represented by the output of the adder 52 and applied to the input of interference canceller 4.

Under all or most circumstances, orthogonality exists between the vectors of the tap weight coefficients of the matched filter and the spread code of an undesired station. As long as the orthogonally is maintained at the matched filter, the desired signal has a high signal to noise ratio. If the orthogonality is lost with respect to one or more undesired signals, interference would result. However, the tap weight coefficients of the interference canceller are feedback-controlled according to the same algorithm as used in the previous embodiments to remove the interference.

Figure 6:
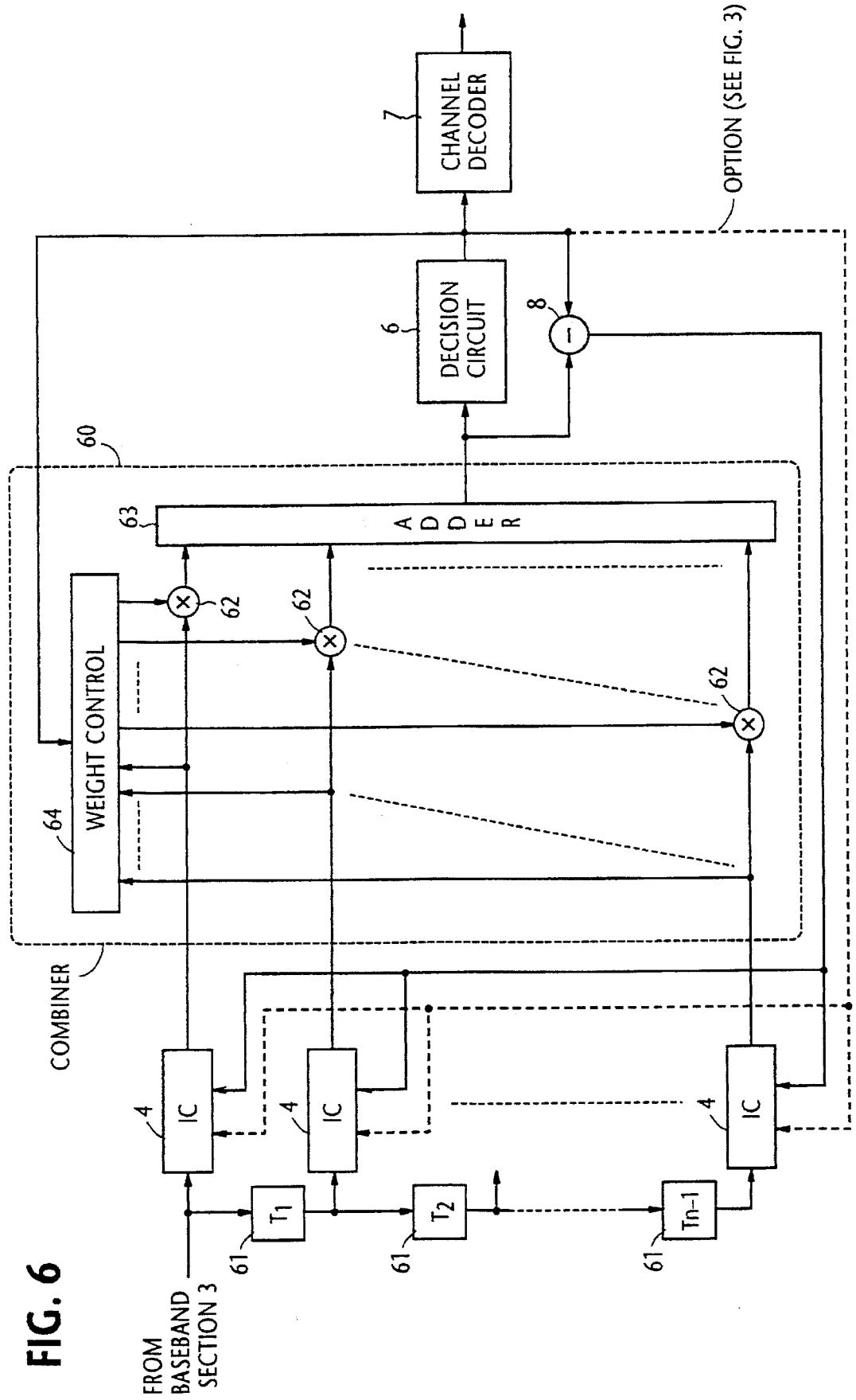
FIG. 6 is a block diagram of a DS/CDMA receiver of RAKE receiver configuration according to a second embodiment of the present invention for multipath environment applications.

For multipath fading environment, a DS/CDMA receiver of RAKE receiver configuration of FIG. 6 can be used to advantage. The receiver includes a delay line formed by delay-line elements 61 each introducing a specified amount of delay corresponding to the chip interval Tc multiplied by an integer including unity. These delay times are determined so that the multipath components of the desired signal appear at the successive taps of the delay line. Connected to the delay-line taps are interference cancellers 4 of the same structure as described previously. At the interference cancellers 4, the multipath components of the desired signal which occur at other than the specified timing are treated as if they were undesired signals and cancelled since these components behave as if they were chipped with a different spread code. On the other hand, those of the multipath components which occur at the specified timing are extracted.

A maximum-ratio combiner 60 is provided which includes a plurality of multipliers 62 corresponding to the interference cancellers 4. Each multiplier 62 provides weighting of the output of the corresponding interference canceller with a weight coefficient supplied from a controller 64. The outputs of the multipliers 62 are summed by an adder 63 and fed into the decision circuit 6. The weight coefficients are derived by the weight controller 64 by detecting correlations between the inputs of the multipliers 62 and the output of the decision circuit 6 and updating the correlations so that the outputs of all the interference cancellers 4 are combined with a maximum ratio.

Figure 7:
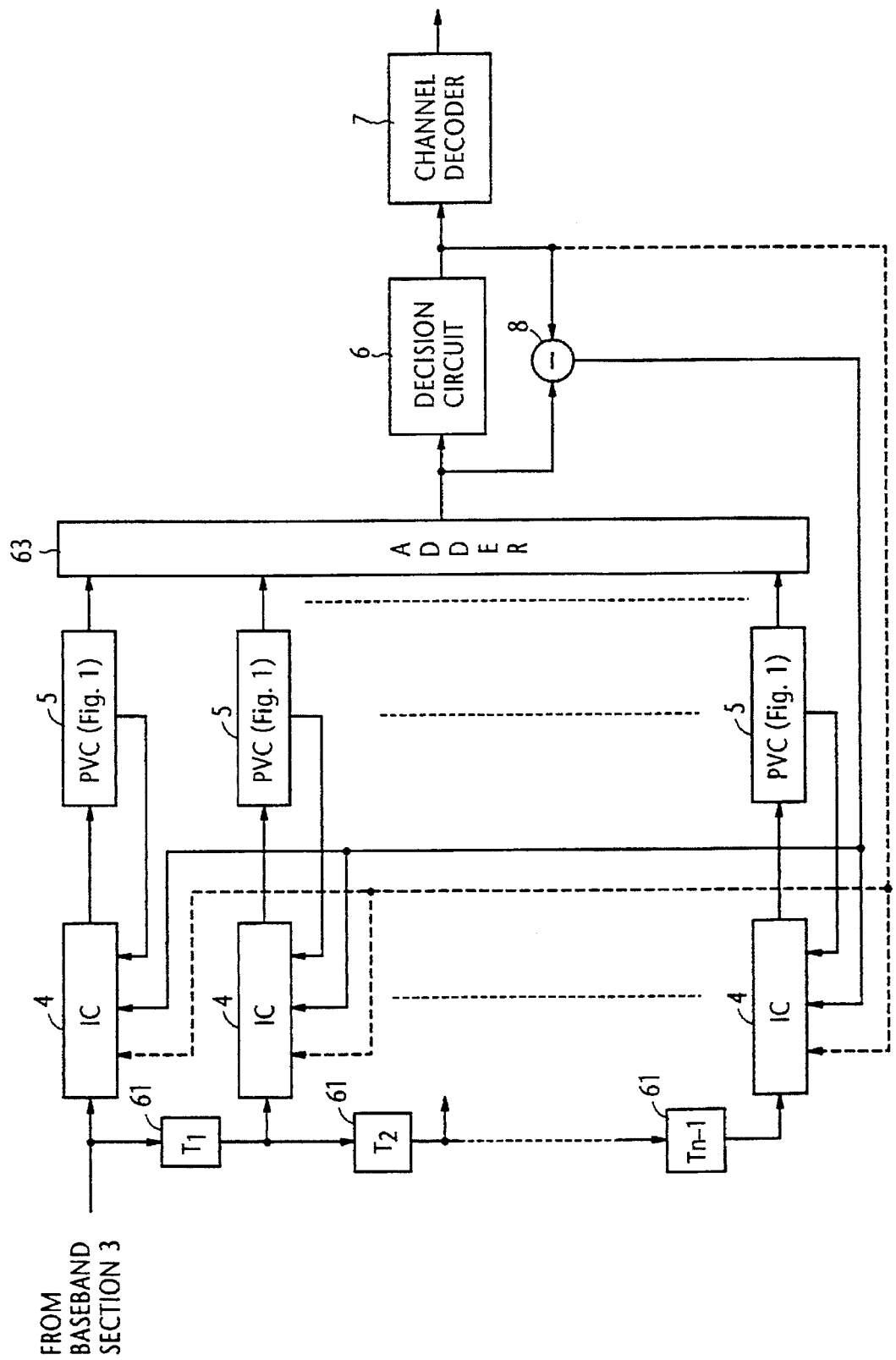
FIG. 7 is a block diagram of a modified form of the DS/CDMA receiver of FIG. 6 using the phase variation cancellers of FIG. 1.

In FIG. 7, the embodiment of FIG. 6 is modified to include a plurality of phase variation cancellers 5 (FIG. 1) connected respectively to to the interference cancellers 4. In this modification, the multipliers 62 of FIG. 6 are dispensed with since their weight coefficients can be set equal to unity. The outputs of phase variation cancellers 5 are summed by the adder 63 and fed into the decision circuit 6.

Figure 8:
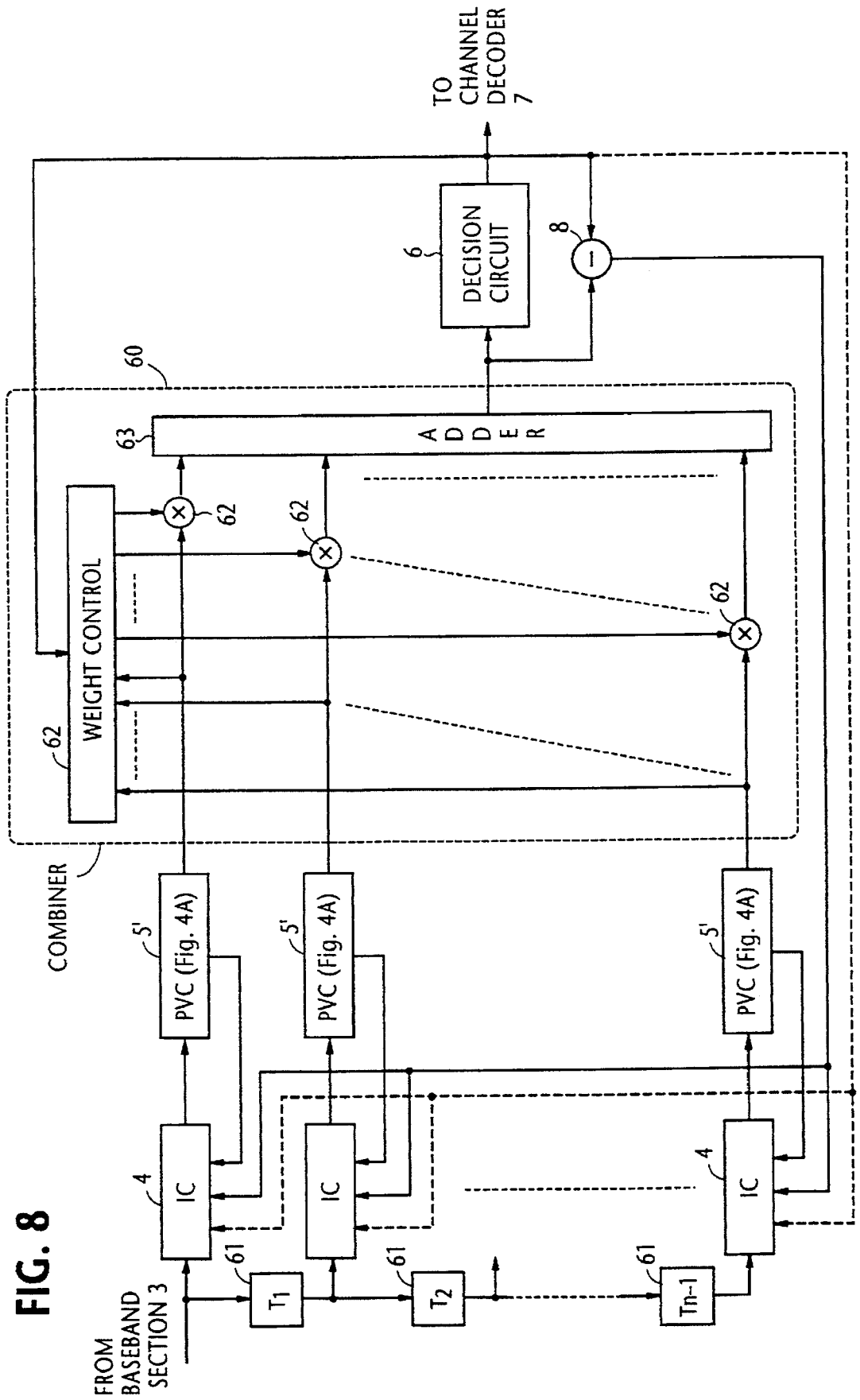
FIG. 8 is a block diagram of a modified form of the DS/CDMA receiver of FIG. 6 using the phase variation cancellers of FIG. 4.

If use is made of the phase variation cancellers 5' of FIG. 4, instead of the cancellers 5 of FIG. 1, for multipath applications, the maximum ratio combiner 60 is used to advantage in conjunction with the phase variation cancellers 5' as illustrated in FIG. 8.

Figure 9:
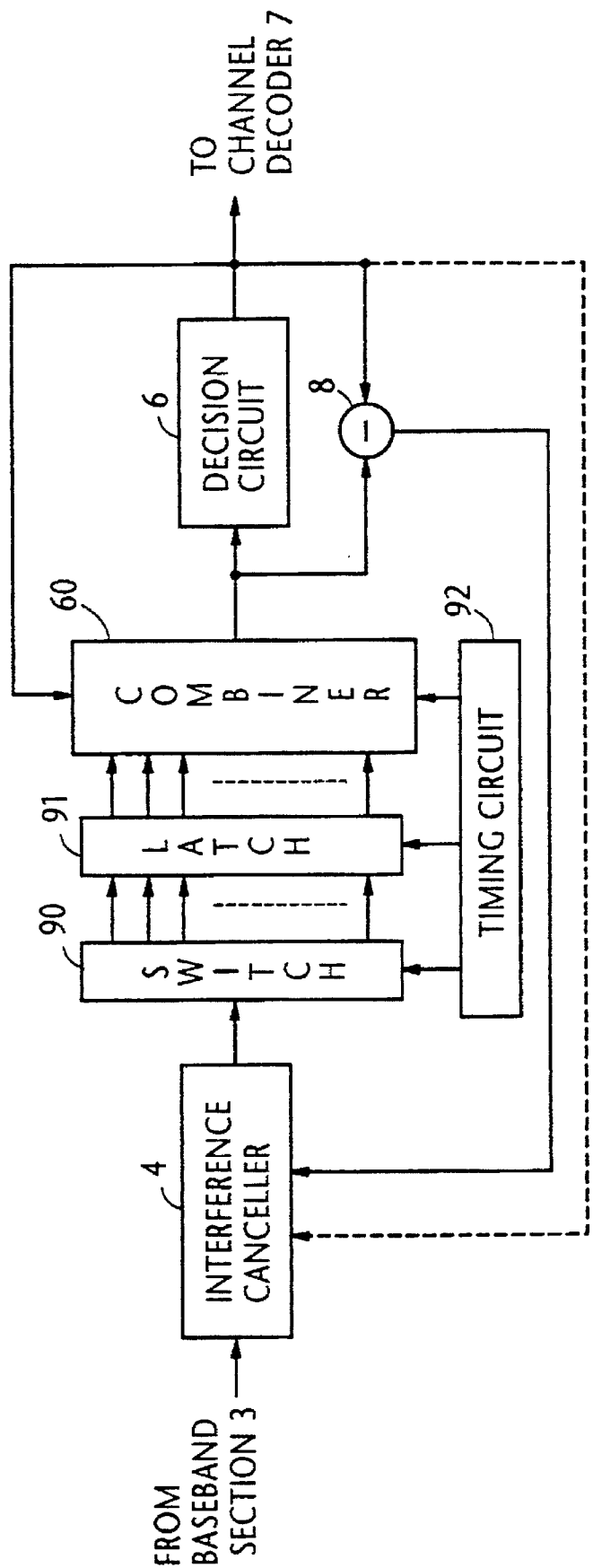
FIGS. 9, 10 and 11 are block diagrams of the DS/CDMA receivers of FIGS. 6, 7 and 8, respectively, for digital signal processing applications.
Figure 10:
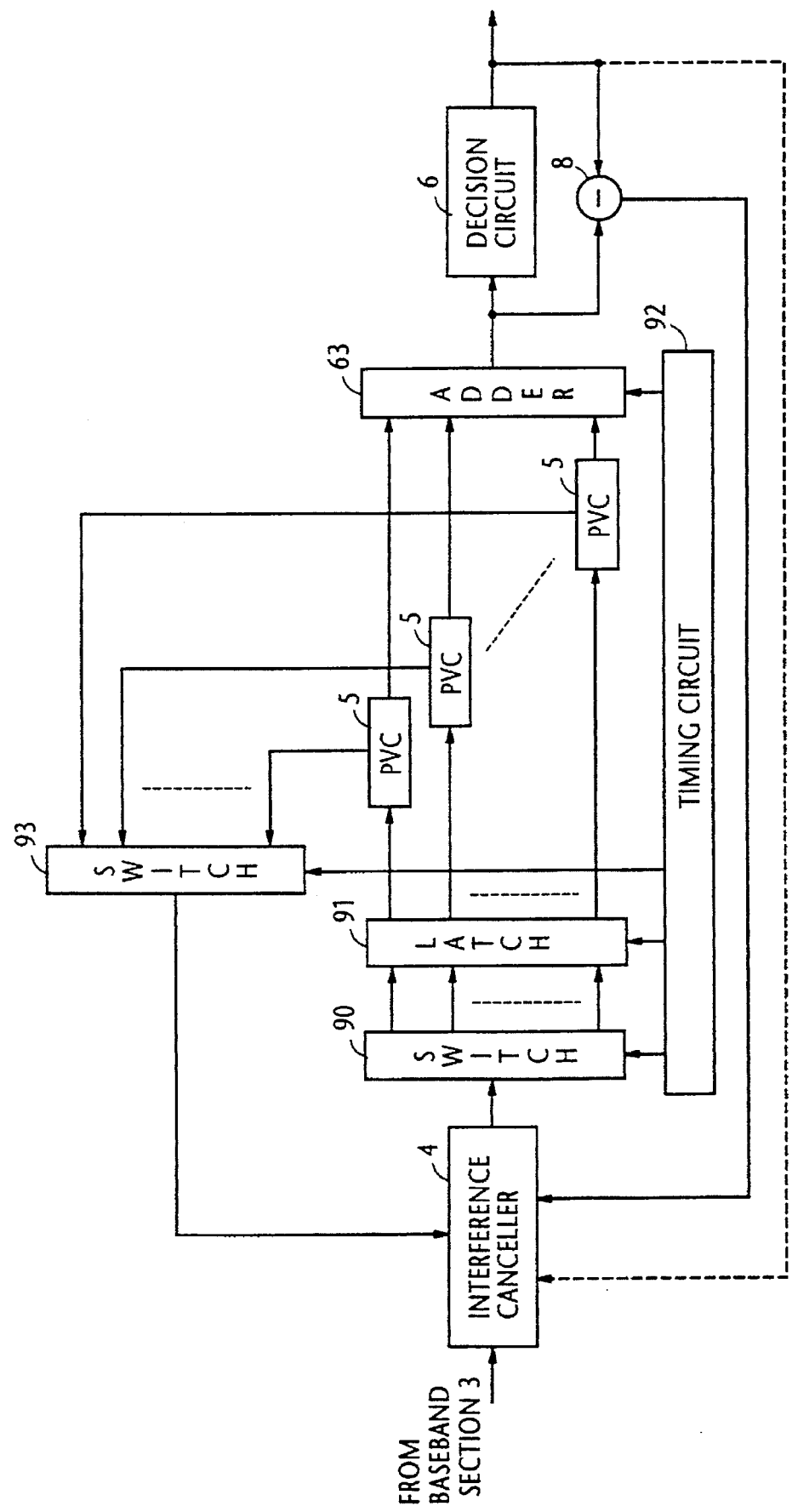
Figure 11:
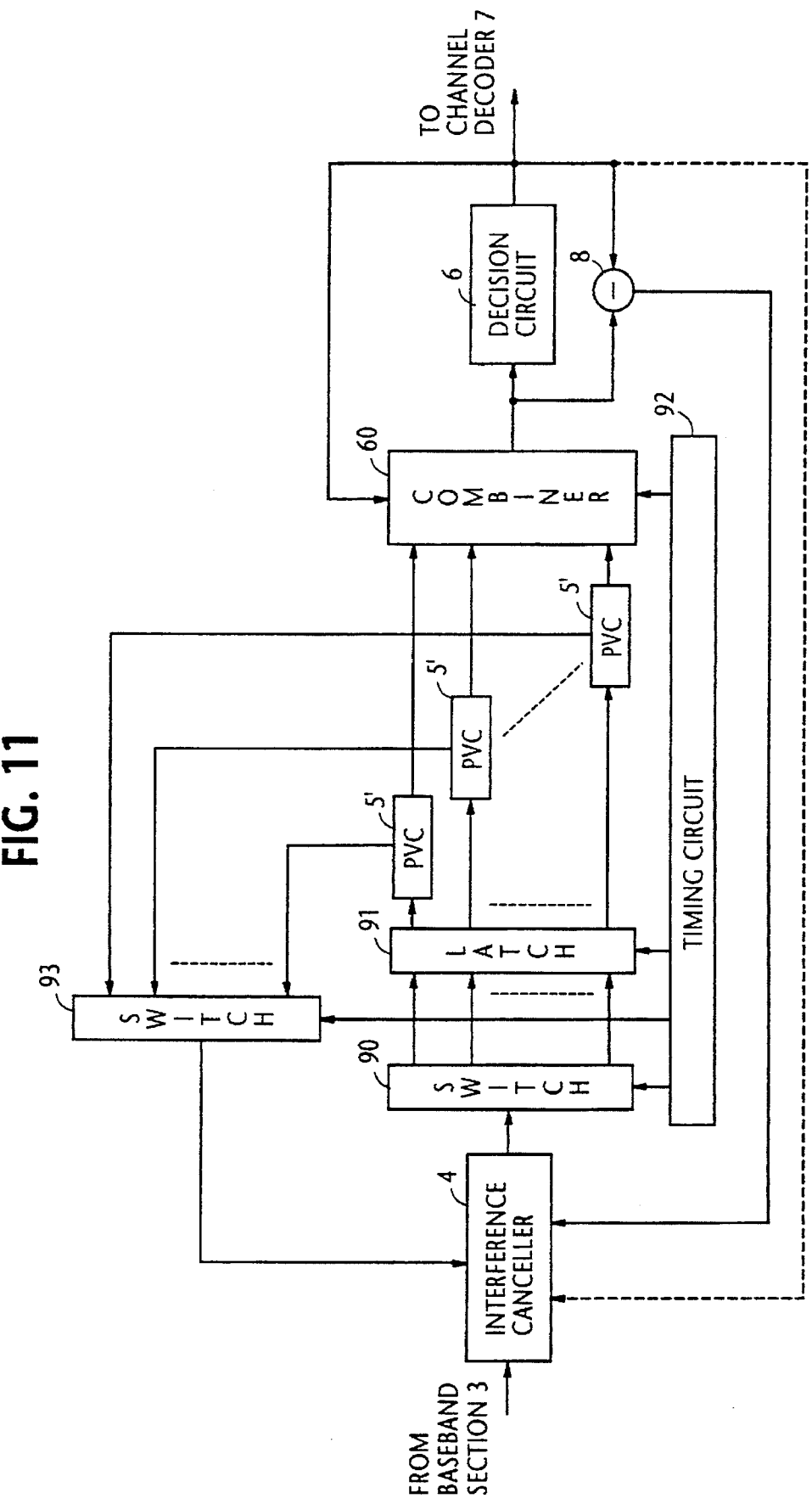

The CDMA receivers of the RAKE configuration shown in FIGS. 6, 7 and 8 are implemented with digital signal processors as shown in FIGS. 9, 10 and 11, respectively.

In FIG. 9, the embodiment of FIG. 6 is modified by the provision of a switch 90 and a latch circuit 91 which are driven by a timing circuit 92. Instead of using a plurality of interference cancellers 4, a single interference canceller 4 is provided between the output of baseband section 3 and the input of the switch 90. Switch 90 has a plurality of output terminals corresponding respectively to the successive taps of the delay line of FIG. 6 and is controlled by the timing circuit 92 so that it sequentially establishes a path from its input terminal to one of its output terminals corresponding to the timing at which the signal appears at the corresponding tap of the delay line. Latch circuit 91 has a plurality of latch elements corresponding respectively to the output terminals of switch 90 to store all multipath signal components of the output of interference canceller 4, which are supplied to the maximum ratio combiner 60 where the latched signals are weighted respectively and summed together. When the combiner 60 produces an output signal, the latch circuit 91 is cleared and the switch 90 is returned to the staring position to repeat the process.

The embodiment of FIG. 7 is modified as shown in FIG. 10 which differs from FIG. 9 by the inclusion of a plurality phase variation cancellers 5 (FIG. 1) and a switch 93. Phase variation cancellers 5 are connected between the latch 91 and the adder 63. Switch 93 is driven by timing circuit 92 to sequentially couple the phase rotation vector ($e^{j\theta}$) of each of these phase variation cancellers 5 to the interference canceller 4 for cancelling interference from undesired signal sources in cooperation with the decision error output signal. The outputs of phase variation cancellers 5 are summed by the adder 63 in response to a timing signal from timing circuit 92 when all the output terminals of switch 90 are scanned. Latch 91 is then cleared, and the switch 90 is returned to the starting position to repeat the process.

The embodiment of FIG. 8 is modified as shown in FIG. 11 which differs from FIG. 10 by the use of phase variation cancellers 5' of FIG. 4A, instead of cancellers 5 of FIG. 1.

What is claimed is:

1. A receiver for a direct-sequence code division multiple access (DS/CDMA) communication system wherein a plurality of signal sources transmit DS/CDMA signals on a radio frequency carrier, each of the DS/CDMA signals being produced by spreading a symbol with a unique spread code at predetermined chip intervals, comprising:

receiver means having a spectral bandwidth for receiving said DS/CDMA signals;

an interference canceller for cancelling signals from desired sources introduced to a signal received by the receiver means from a desired source by using a feedback signal;

a phase variation canceller for cancelling a fading-related phase variation that occurs between successive symbols of the signal from the desired source;

decision means for comparing an input signal with a decision threshold and producing an output signal representing one of two discrete values depending on whether the input signal is higher or lower than the threshold, the interference canceller and the phase variation canceller being connected in series between said receiver means and said decision means for producing an interference- and phase-variation-cancelled signal, and correction signal generator means for deriving a correction signal from said interference- and phase-variation cancelled signal and applying the correction signal to said interference canceller as said feedback signal, wherein the interference canceller is a linear equalizer including:

a tapped-delay line having delay-line tap intervals equal to or smaller than said predetermined chip intervals;

a plurality of multipliers connected to successive taps of the delay line for multiplying tap signals on said successive taps with respective tap weight vectors;

an adder for summing outputs of the multipliers to produce a signal as an output signal of the interference canceller; and a tap-weight controller for deriving said tap weight vectors respectively from correlations between said tap signals and said feedback signal, whereby the tap weight vectors are orthogonally oriented to the signals from the undesired sources.

2. A receiver as claimed in claim 1, wherein said phase variation canceller is connected to the output of said interference canceller and comprises:

delay means for introducing a delay corresponding to one symbol of said DS/CDMA signal into an output signal of said interference canceller; and multiplier means for multiplying the output signal of said interference canceller with the signal delayed by said delay means.

3. A receiver as claimed in claim 2, wherein said phase variation canceller further comprises an automatic gain controlled amplifier connected to the output of said interference canceller for generating a constant amplitude signal and applying the constant amplitude signal to said delay means and said multiplier means.

4. A receiver as claimed in claim 2, wherein said phase variation canceller further comprises a normalizer connected between said delay means and said multiplier means.

5. A receiver as claimed in claim 1, wherein said correction signal generator means includes error detector means for detecting an error between the input and output signals of said decision means as said correction signal.

6. A receiver as claimed in claim 5, wherein said interference canceller further comprises a decision feedback equalizer which comprises;

a tapped-delay line for receiving the output signal of the decision means, the second tapped-delay line delay-line tap intervals equal to symbol intervals at which said symbol occurs;

a plurality of multipliers for multiplying tap signals of the tapped-delay line with respective tap weight vectors;

an adder for summing outputs of the multipliers to produce sum signal;

means for combining the sum signal with the output signal of the adder of the linear equalizer to produce a signal as an output signal of the interference canceller; and a tap-weight controller for deriving the tap weight vectors of the second tapped-delay line respectively from correlations between the tap signals of the second tapped-delay line and the error detected by the error detector means.

7. A receiver as claimed in claim 1, wherein said phase variation canceller is connected between said interference canceller and said decision means, and comprises:

means for deriving a reference carrier from input and output signals of said decision means; and means for synchronizing the output signal of said interference canceller to said reference carrier.

8. A receiver as claimed in claim 1, wherein said phase variation canceller is connected between said receiver means and said interference canceller and comprises:

means for deriving a reference carrier from input and output signals of said decision means; and means for synchronizing the output signal of said receiver means to said reference carrier.

9. A receiver as claimed in claim 7 or 8, wherein said reference carrier deriving means comprises:

phase detector means for detecting a phase difference between the input and output signals of said decision means; and integrator means for integrating said phase difference for producing said reference carrier.

10. A receiver as claimed in claim 7 or 8, wherein said synchronizing means comprises a phase shifter for shifting the output signal of said interference canceller according to said reference carrier.

11. A receiver as claimed in claim 7 or 8, wherein said synchronizing means comprises a phase shifter for shifting the output signal of said receiver means according to said reference carrier.

12. A receiver as claimed in claim 1, 2 or 8, wherein said interference canceller further comprises a decision feedback equalizer which comprises:

a tapped-delay line for receiving the output signal of the decision means, the second tapped-delay line delay-line tap intervals equal to symbol intervals at which said symbol occurs;

a plurality of multipliers for multiplying tap signals of the tapped-delay line with respective tap weight vectors;

an adder for summing outputs of the multipliers to produce a sum signal;

means for combining the sum signal with the output signal of the adder of the linear equalizer to produce a signal as an output signal of the interference canceller; and a tap-weight controller for deriving the tap weight vectors of the second tapped-delay line respectively from correlations between the tap signals of the second tapped-delay lines and said feedback signal.

13. A receiver as claimed in claim 1, further comprising a matched filter connected between said receiver means and said interference canceller for despreading the signal received by the receiver means from said desired source according to said predetermined spread code.

14. A receiver for a direct-sequence code division multiple access (DS/CDMA) communication system wherein a symbol is spread with a predetermined spread code to produce a DS/CDMA signal which is transmitted on a radio frequency carrier, comprising:

receiver means for receiving said signal from a desired source;

a delay line connected to said receiver means, the delay line having a plurality of successive taps;

a plurality of interference cancellers connected respectively to said successive taps, each of the interference cancellers cancelling components of the signal from said desired source according to a first feedback signal, said components being introduced to the signal received by the receiver means as a result of multipath fading effect;

maximum ratio combiner means for weighting output signals of said interference cancellers according to a second feedback signal and summing the weighted output signals to produce a weighted sum signal;

decision means for comparing said weighted sum signal with a decision threshold to produce an output signal representing one of two discrete values depending on whether the weighted sum signal is higher or lower than the threshold, and supplying the output signal of the decision means to said maximum ratio combiner means as said second feedback signal; and error detector means for detecting an error between the input and output signals of said decision means and applying the detected error to each of said interference cancellers as said first feedback signal.

15. A receiver for a direct-sequence code division multiple access (DS/CDMA) communication system wherein a symbol is spread with a predetermined spread code to produce a DS/CDMA signal which is transmitted on a radio frequency carrier, comprising:

receiver means for receiving said signal from a desired source;

a delay line connected to said receiver means, the delay line having a plurality of successive taps;

a plurality of interference cancellers connected respectively to said successive taps, each of the interference cancellers cancelling components of the signal from said desired source according to a correction signal, said components being introduced to the signal received by the receiver means as a result of multipath fading effect;

a plurality of phase variation cancellers connected respectively to outputs of the interference cancellers, each of the phase variation cancellers cancelling a phase variation that occurs in an interval between successive symbols of the signal received by said receiver means;

summing means for combining output signals of said phase variation cancellers to produce a sum signal;

decision means for comparing said sum signal with a decision threshold to produce an output signal representing one of two discrete values depending on whether the compared signal is higher or lower than the threshold; and error detector means for detecting an error between the input and output signals of said decision means and applying the detected error to each of said interference cancellers as said correction signal.

16. A receiver for a direct-sequence code division multiple access (DS/CDMA) communication system wherein a symbol is spread with a predetermined spread code to produce a DS/CDMA signal which is transmitted on a radio frequency carrier, comprising:

receiver means for receiving said signal from a desired source;

a delay line connected to said receiver means, the delay line having a plurality of successive taps;

a plurality of interference cancellers connected respectively to said successive taps, each of the interference cancellers cancelling components of the signal from said desired source according to a first feedback signal, said components being introduced to the signal received by the receiver means as a result of multipath fading effect;

a plurality of phase variation cancellers connected respectively to outputs of the interference cancellers, each of the phase variation cancellers cancelling a phase variation that occurs in an interval between successive symbols of the signal received by said receiver means;

maximum ratio combiner means for weighting output signals of said phase variation cancellers according to a second feedback signal and summing the weighted output signals to produce a weighted sum signal;

decision means for comparing said weighted sum signal with a decision threshold to produce an output signal representing one of two discrete values depending on whether the weighted sum signal is higher or lower than the threshold and supplying the output signal of the decision means to said maximum ratio combiner means as said second feedback signal; and error detector means for detecting an error between the input and output signals of said decision means and applying the detected error to each of said interference cancellers as said first feedback signal.

17. A receiver as claimed in claim 14, 15 or 16, wherein each of said interference cancellers comprises a linear equalizer for cancelling said components according to the error detected by said error detector means.

18. A receiver as claimed in claim 14, 15 or 16, wherein each of said interference cancellers comprises a decision feedback equalizer for cancelling said components according to the error detected by said error detector means and the output signal of said decision means.

19. A receiver as claimed in claim 15 or 16, wherein each of said phase variation cancellers comprises:

delay means for introducing a delay corresponding to one symbol of said DS/CDMA signal into an output signal of a corresponding one of said interference cancellers; and multiplier means for multiplying the output signal of said corresponding interference canceller with the signal delayed by said delay means.

20. A receiver as claimed in claim 19, wherein each of said phase variation cancellers further comprises an automatic gain controlled amplifier connected to the output of a corresponding one of said interference cancellers for generating a constant amplitude signal and applying the constant amplitude signal to said delay means and said multiplier means.

21. A receiver as claimed in claim 19, wherein each of said phase variation cancellers further comprises a normalizer connected between said delay means and said multiplier means.

22. A receiver as claimed in claim 15 or 16, wherein each of said phase variation cancellers comprises:

means for deriving a reference carrier from input and output signals of said decision means; and means for synchronizing the output signal of said interference canceller to said reference carrier.

23. A receiver as claimed in claim 22, wherein said reference carrier deriving means comprises:

phase detector means for detecting a phase difference between the input and output signals of said decision means; and integrator means for integrating said phase difference for producing said reference carrier.

24. A receiver as claimed in claim 22, wherein said synchronizing means comprises a phase shifter for shifting the output signal of said interference canceller according to said reference carrier.

25. A receiver for a direct-sequence code division multiple access (DS/CDMA) communication system wherein a symbol is spread with a predetermined spread code to produce a DS/CDMA signal which is transmitted on a radio frequency carrier, comprising:

receiver means for receiving said signal from a desired source;

an interference canceller connected to said receiver means for cancelling components of the signal from said desired source according to a first feedback signal, said components being introduced to the signal received by the receiver means as a result of multipath fading effect;

latch means having a plurality of elements;

means for sequentially coupling an output signal of said interference canceller to said element of the latch means;

maximum ratio combiner means for weighting output signals of said elements of the latch means according to a second feedback signal and summing the weighted output signals to produce a weighted sum signal;

decision means for comparing said weighted sum signal with a decision threshold to produce an output signal representing one of two discrete values depending on whether the weighted sum signal is higher or lower than the threshold, and supplying the output signal of the decision means to said maximum ratio combiner means as said second feedback signal; and error detector means for detecting an error between the input and output signals of said decision means and applying the detected error to interference cancellers as said first feedback signal.

26. A receiver for a direct-sequence code division multiple access (DS/CDMA) communication system wherein a symbol is spread with a predetermined spread code to produce a DS/CDMA signal which is transmitted on a radio frequency carrier, comprising:

receiver means for receiving said signal from a desired source;

an interference canceller connected to said receiver means for cancelling components of the signal from said desired source according to a correction signal, said components being introduced to the signal received by the receiver means as a result of multipath fading effect;

latch means having a plurality of latch elements;

means for sequentially coupling an output signal of said interference canceller to said elements of the latch means;

a plurality of phase variation cancellers connected respectively to said elements of the latch means, each of the phase variation cancellers cancelling a phase variation that occurs in an interval between successive symbols of the signal received by said receiver means;

summing means for combining output signals of said phase variation cancellers to produce a sum signal;

decision means for comparing said sum signal with a decision threshold to produce an output signal representing one of two discrete values depending on whether the compared signal is higher or lower than the threshold; and error detector means for detecting an error between the input and output signals of said decision means and applying the detected error to said interference cancellers as said correction signal.

27. A receiver for a direct-sequence code division multiple access (DS/CDMA) communication system wherein a symbol is spread with a predetermined spread code to produce a DS/CDMA signal which is transmitted on a radio frequency carrier, comprising:

receiver means for receiving said signal from a desired source;

an interference canceller connected to said receiver means for cancelling components of the signal from said desired source according to a first feedback signal, said components being introduced to the signal received by the receiver means as a result of multipath fading effect;

latch means having a plurality of latch elements;

means for sequentially coupling an output signal of said interference canceller to said elements of the latch means;

a plurality of phase variation cancellers connected respectively to said elements of the latch means, each of the phase variation cancellers cancelling a phase variation that occurs in an interval between successive symbols of the signal received by said receiver means;

maximum ratio combiner means for weighting output signals of said phase variation cancellers according to a second feedback signal and summing the weighted output signals to produce a weighted sum signal;

decision means for comparing said weighted sum signal with a decision threshold to produce an output signal representing one of two discrete values depending on whether the weighted sum signal is higher or lower than the threshold and supplying the output signal of the decision means to said maximum ratio combiner means as said second feedback signal; and error detector means for detecting an error between the input and output signals of said decision means and applying the detected error to said interference canceller as said first feedback signal.

28. A receiver as claimed in claim 25, 26 or 27, wherein said interference canceller comprises a linear equalizer for cancelling said components according to the error detected by said error detector means.

29. A receiver as claimed in claim 25, 26 or 27, wherein each of said interference cancellers comprises a decision feedback equalizer for cancelling said components according to the error detected by said error detector means and the output signal of said decision means.

30. A receiver as claimed in claim 26 or 27, wherein each of said phase variation cancellers comprises:

delay means for introducing a delay corresponding to one symbol of said DS/CDMA signal into an output signal of said interference canceller; and multiplier means for multiplying the output signal of said interference canceller with the signal delayed by said delay means.

31. A receiver as claimed in claim 30, wherein each of said phase variation cancellers further comprises an automatic gain controlled amplifier connected to the output of said interference canceller for generating a constant amplitude signal and applying the constant amplitude signal to said delay means and said multiplier means.

32. A receiver as claimed in claim 30, wherein each of said phase variation cancellers further comprises a normalizer connected between said delay means and said multiplier means.

33. A receiver as claimed in claim 26 or 27, wherein each of said phase variation cancellers comprises:

means for deriving a reference carrier from input and output signals of said decision means; and means for synchronizing the output signal of said interference canceller to said reference carrier.

34. A receiver as claimed in claim 33, wherein said reference carrier deriving means comprises:

phase detector means for detecting a phase difference between the input and output signals of said decision means; and integrator means for integrating said phase difference for producing said reference carrier.

35. A receiver as claimed in claim 33, wherein said synchronizing means comprises a phase shifter for shifting the output signal of said interference canceller according to said reference carrier.

36. A receiver for a direct-sequence code division multiple access (DS/CDMA) communication system wherein a plurality of signal sources transmit DS/CDMA signals on a radio frequency carrier, each of the DS/CDMA signals being produced by spreading a symbol with a unique spread code at predetermined chip intervals, comprising:

a receiver device having a spectral bandwidth for receiving said DS/CDMA signals;

an interference canceller for cancelling signals from desired sources introduced to a signal received by the receiver device from a desired source by using a feedback signal;

a phase variation canceller for cancelling a fading-related phase variation that occurs between successive symbols of the signal from the desired source;

a decision circuit for comparing an input signal with a decision threshold and producing an output signal representing one of two discrete values depending on whether the input signal is higher or lower than the threshold, the interference canceller and the phase variation canceller being connected in series between said receiver device and said decision circuit for producing an interference- and phase-variation-cancelled signal, and a correction signal generator for deriving a correction signal from said interference- and phase-variation cancelled signal and applying the correction signal to said interference canceller as said feedback signal, wherein the interference canceller is a linear equalizer including:

a tapped-delay line having delay-line tap intervals equal to or smaller than said predetermined chip intervals;

a plurality of multipliers connected to successive taps of the delay line for multiplying tap signals on said successive taps with respective tap weight vectors;

an adder for summing outputs of the multipliers to produce a signal as an output signal of the interference canceller; and a tap-weight controller for deriving said tap weight vectors respectively from correlations between said tap signals and said feedback signal, whereby the tap weight vectors are orthogonally oriented to the signals from the undesired sources.

37. A receiver for a direct-sequence code division multiple access (DS/CDMA) communication system wherein a symbol is spread with a predetermined spread code to produce a DS/CDMA signal which is transmitted on a radio frequency carrier, comprising:

a receiver device for receiving said signal from a desired source;

a delay line connected to said receiver device, the delay line having a plurality of successive taps;

a plurality of interference cancellers connected respectively to said successive taps, each of the interference cancellers cancelling components of the signal from said desired source according to a first feedback signal, said components being introduced to the signal received by the receiver device as a result of multipath fading effect;

a maximum ratio combiner for weighting output signals of said interference cancellers according to a second feedback signal and summing the weighted output signals to produce a weighted sum signal;

a decision circuit for comparing said weighted sum signal with a decision threshold to produce an output signal representing one of two discrete values depending on whether the weighted sum signal is higher or lower than the threshold, and supplying the output signal of the decision circuit to said maximum ratio combiner as said second feedback signal; and an error detector for detecting an error between the input and output signals of said decision circuit and applying the detected error to each of said interference cancellers as said first feedback signal.

38. A receiver for a direct-sequence code division multiple access (DS/CDMA) communication system wherein a symbol is spread with a predetermined spread code to produce a DS/CDMA signal which is transmitted on a radio frequency carrier, comprising:

a receiver device for receiving said signal from a desired source;

a delay line connected to said receiver device, the delay line having a plurality of successive taps;

a plurality of interference cancellers connected respectively to said successive taps, each of the interference cancellers cancelling components of the signal from said desired source according to a correction signal, said components being introduced to the signal received by the receiver device as a result of multipath fading effect;

a plurality of phase variation cancellers connected respectively to outputs of the interference cancellers, each of the phase variation cancellers cancelling a phase variation that occurs in an interval between successive symbols of the signal received by said receiver device;

a summing device for combining output signals of said phase variation cancellers to produce a sum signal;

a decision circuit for comparing said sum signal with a decision threshold to produce an output signal representing one of two discrete values depending on whether the compared signal is higher or lower than the threshold; and error detector for detecting an error between the input and output signals of said decision circuit and applying the detected error to each of said interference cancellers as said correction signal.

39. A receiver for a direct-sequence code division multiple access (DS/CDMA) communication system wherein a symbol is spread with a predetermined spread code to produce a DS/CDMA signal which is transmitted on a radio frequency carrier, comprising:

a receiver device for receiving said signal from a desired source;

a delay line connected to said receiver device, the delay line having a plurality of successive taps;

a plurality of interference cancellers connected respectively to said successive taps, each of the interference cancellers cancelling components of the signal from said desired source according to a first feedback signal, said components being introduced to the signal received by the receiver device as a result of multipath fading effect;

a plurality of phase variation cancellers connected respectively to outputs of the interference cancellers, each of the phase variation cancellers cancelling a phase variation that occurs in an interval between successive symbols of the signal received by said receiver device;

a maximum ratio combiner for weighting output signals of said phase variation cancellers according to a second feedback signal and summing the weighted output signals to produce a weighted sum signal;

a decision circuit for comparing said weighted sum signal with a decision threshold to produce an output signal representing one of two discrete values depending on whether the weighted sum signal is higher or lower than the threshold and supplying the output signal of the decision circuit to said maximum ratio combiner as said second feedback signal; and an error detector for detecting an error between the input and output signals of said decision circuit and applying the detected error to each of said interference cancellers as said first feedback signal.

40. A receiver for a direct-sequence code division multiple access (DS/CDMA) communication system wherein a symbol is spread with a predetermined spread code to produce a DS/CDMA signal which is transmitted on a radio frequency carrier, comprising:

a receiver device for receiving said signal from a desired source;

an interference canceller connected to said receiver device for cancelling components of the signal from said desired source according to a first feedback signal, said components being introduced to the signal received by the receiver device as a result of multipath fading effect;

a latch having a plurality of elements;

a sequential coupling device for sequentially coupling an output signal of said interference canceller to said elements of the latch;

a maximum ratio combiner for weighting output signals of said elements of the latch according to a second feedback signal and summing the weighted output signals to produce a weighted sum signal;

a decision circuit for comparing said weighted sum signal with a decision threshold to produce an output signal representing one of two discrete values depending on whether the weighted sum signal is higher or lower than the threshold, and supplying the output signal of the decision circuit to said maximum ratio combiner as said second feedback signal; and an error detector for detecting an error between the input and output signals of said decision circuit and applying the detected error to said interference canceller as said first feedback signal.

41. A receiver for a direct-sequence code division multiple access (DS/CDMA) communication system wherein a symbol is spread with a predetermined spread code to produce a DS/CDMA signal which is transmitted on a radio frequency carrier, comprising:

a receiver device for receiving said signal from a desired source;

an interference canceller connected to said receiver device for cancelling components of the signal from said desired source according to a correction signal, said components being introduced to the signal received by the receiver device as a result of multipath fading effect;

a latch having a plurality of latch elements;

a sequential coupling device for sequentially coupling an output signal of said interference canceller to said elements of the latch;

a plurality of phase variation cancellers connected respectively to said elements of the latch, each of the phase variation cancellers cancelling a phase variation that occurs in an interval between successive symbols of the signal received by said receiver device;

a summing device for combining output signals of said phase variation cancellers to produce a sum signal;

a decision circuit for comparing said sum signal with a decision threshold to produce an output signal representing one of two discrete values depending on whether the compared signal is higher or lower than the threshold; and an error detector for detecting an error between the input and output signals of said decision circuit and applying the detected error to said interference canceller as said correction signal.

42. A receiver for a direct-sequence code division multiple access (DS/CDMA) communication system wherein a symbol is spread with a predetermined spread code to produce a DS/CDMA signal which is transmitted on a radio frequency carrier, comprising:

a receiver device for receiving said signal from a desired source;

an interference canceller connected to said receiver device for cancelling components of the signal for said desired source according to a first feedback signal, said components being introduced to the signal received by the receiver device as a result of multipath fading effect;

a latch having a plurality of latch elements;

a sequential coupling device for sequentially coupling an output signal of said interference canceller to said elements of the latch;

a plurality of phase variation cancellers connected respectively to said elements of the latch, each of the phase variation cancellers cancelling a phase variation that occurs in an interval between successive symbols of the signal received by said receiver device;

a maximum ratio combiner for weighting output signals of said phase variation cancellers according to a second feedback signal and summing the weighted output signals to produce a weighted sum signal;

a decision circuit for comparing said weighted sum signal with a decision threshold to produce an output signal representing one of two discrete values depending on whether the weighted sum signal is higher or lower than the threshold and supplying the output signal of the decision circuit to said maximum ration combiner as said second feedback signal; and an error detector for detecting an error between the input and output signals of said decision circuit and applying the detected error to said interference canceller as said first feedback signal.

* * * * *